United States Patent [19]
Joanisse et al.

[11] Patent Number: 6,155,525
[45] Date of Patent: Dec. 5, 2000

[54] ADJUSTABLE, TELESCOPIC, SUPPORT

[76] Inventors: Denis Joanisse, 12 Rue Yves Theriault, N.D.I.P., Québec, Canada, J7V 8P6; Fausto Rossetto; Paul Rossetto, both of 4915 Kirby Rd., Woodbridge, Ontario, Canada, L4L 1A6

[21] Appl. No.: 09/265,797

[22] Filed: Mar. 10, 1999

[51] Int. Cl.[7] .................................................. E04G 3/00
[52] U.S. Cl. ...................... 248/287.1; 108/44; 224/42.32
[58] Field of Search ............................ 248/287.1, 279.1, 248/451, 452, 448, 460, 462, 122.1, 125.1, 124.1, 125.8, 125.7, 176.1, 178.1, 424; 108/44, 23, 26; 224/42.32, 550

[56] References Cited

U.S. PATENT DOCUMENTS

| | | | |
|---|---|---|---|
| 2,663,764 | 12/1953 | Holmes | 248/279.1 X |
| 3,160,379 | 12/1964 | Gardella . | |
| 3,905,573 | 9/1975 | Davis | 248/445 |
| 4,355,779 | 10/1982 | Heled | 248/460 |
| 4,582,285 | 4/1986 | Bello | 248/442.2 |
| 4,611,734 | 9/1986 | Luecking et al. | 224/42.42 |
| 4,741,504 | 5/1988 | Monroe | 248/286 |
| 4,878,685 | 11/1989 | Bahm | 280/304.1 |
| 5,174,531 | 12/1992 | Perakis | 248/124 |
| 5,246,240 | 9/1993 | Romich et al. | 280/304.1 |
| 5,370,060 | 12/1994 | Wang | 104/44 |
| 5,485,793 | 1/1996 | Crowell | 108/44 |
| 5,542,360 | 8/1996 | Fleming | 108/44 |
| 5,630,566 | 5/1997 | Case | 248/122.1 |
| 5,671,900 | 9/1997 | Cutlet | 248/451 |
| 5,769,369 | 6/1998 | Meinel | 248/176.1 |

*Primary Examiner*—Anita M. King
*Assistant Examiner*—Tan Le

[57] ABSTRACT

An adjustable telescopic support having an elongated base member and an elongated mounting member. Cooperating guide means on the base and mounting members slidably mount the mounting member on the base member for longitudinal movement relative to the base member. Mounting means are provided on the front of the mounting member for use in mounting a manually operated unit on the support. Cooperating locking means on the base and mounting members selectively lock the mounting member to the base member in one of a plurality of longitudinally spaced apart locking positions so as to be able to position the manually operated unit on the support in a desired working position. The locking means on the mounting member includes an operating handle at the front of the mounting member. The support can be mounted on a support post if desired.

18 Claims, 8 Drawing Sheets

ADJUSTABLE, TELESCOPIC, SUPPORT

BACKGROUND OF THE INVENTION

1. Field of the Invention

This invention is directed toward an adjustable, telescopic support. The invention is more particularly directed toward an adjustable telescopic support of the type having a mounting member slidable on a base member, the mounting member lockable in one of a number of selected positions relative to the base member. The invention is also directed toward a support mounted on a support post, the support post allowing various adjustments in the position of the support. The invention is further directed toward the support post per se.

2. Description of the Related Art Including Information Disclosed Under CFR §§1.97–1.99

The support of the present invention is particularly useful in vehicles such as buses or delivery vans. A bus driver usually must have manually operable units close at hand when he is seated such as fare calculators; change dispensers; transfer dispensers; communication units; or the like. The driver usually brings one or more of these units with him to begin his shift. Usually the bus has a support location to receive the unit(s). However these support locations are usually fixed and what is a comfortable support location for one driver may not be a comfortable location for the next driver.

SUMMARY OF THE INVENTION

It is the purpose of the present invention to provide a simple, relatively inexpensive, adjustable, telescopic support, which, when mounted in a vehicle may be easily adjusted to fit the needs of different people who use the support. The support is easily adjustable, and once adjusted, remains securely locked in place until another adjustment is required. The support can be mounted directly on the vehicle, such as on the dashboard, or on an adjustable support post which in turn is mounted on the vehicle. The adjustable support post is designed to allow adjustment of the support both vertically and angularly relative to a horizontal plane and also horizontally and angularly relative to a vertical axis.

In accordance with the present invention, the support comprises an elongated base member, that is adapted to be fixed directly to the vehicle or to a support post or the like on the vehicle, and an elongated mounting member that is slidably mounted on top of the base member for longitudinal movement relative to the base member. A manually operated unit such as a fare calculating unit, a telephone unit, or like unit, can be detachably mounted on the front of the mounting member of the support. The mounting member can be moved longitudinally relative to the base member to locate the manually operated unit, mounted on the mounting member, at the best working position for an operator of the unit, such as a bus driver. Locking means are provided for locking the mounting member to the base member at or close to this best working position. The locking means can lock the mounting member to the base member at one of a number of positions. The locking means includes an operating handle easily accessible from the front of the support. Operation of the handle unlocks the mounting member from the base member and allows, via the handle, longitudinal adjustment of the mounting member relative to the base member.

The support can be mounted on a support post which comprises one tubular member telescopically mounted within the another tubular member, the one tubular member having an angled carrying unit pivotally mounted at its one free end. The angled unit comprises two arm units pivotally connected together at their adjacent ends and pivotally connected at one free end to the free end of the one tubular member. The support is pivotally connected to the other free end of the angled unit. The arrangement allows adjustment of the support in various manners so that it can be located at the best working position for each user.

The invention is particularly directed toward an adjustable telescopic support having an elongated base member and an elongated mounting member. Cooperating guide means on the base and mounting members slidably mount the mounting member on the base member for longitudinal movement relative to the base member. Mounting means are provided on the front of the mounting member for use in mounting a manually operated unit thereon. Cooperating locking means are provided on the base and mounting members for locking the mounting member to the base member in one of a plurality of longitudinally spaced-apart locking positions.

The invention is also particularly directed toward a support post, the support post having a mounting base, a first tubular section extending up from the base and a second tubular section telescopically mounted within the first section. Locking means are provided for locking the second section at a desired height and angular position relative to the first section. An angled carrying unit is pivotally mounted at one end on the top of the second section. The other end of the carrying unit mounts a manually operable unit.

The carrying unit preferably comprises first and second arm units pivotally connected together at adjacent ends, the other end of one arm unit pivotally connected to the top of the second section of the post and the other end of the second arm unit pivotally connected to the support. The arm units, and their connection to the second post section and to the support allow the position of the support to be adjusted vertically, horizontally and angularly relative to the horizontal. The telescopic post sections allow the position of the support to be adjusted vertically and angularly relative to the vertical axis of the post sections.

DESCRIPTION OF THE PREFERRED EMBODIMENTS

Figure 1:
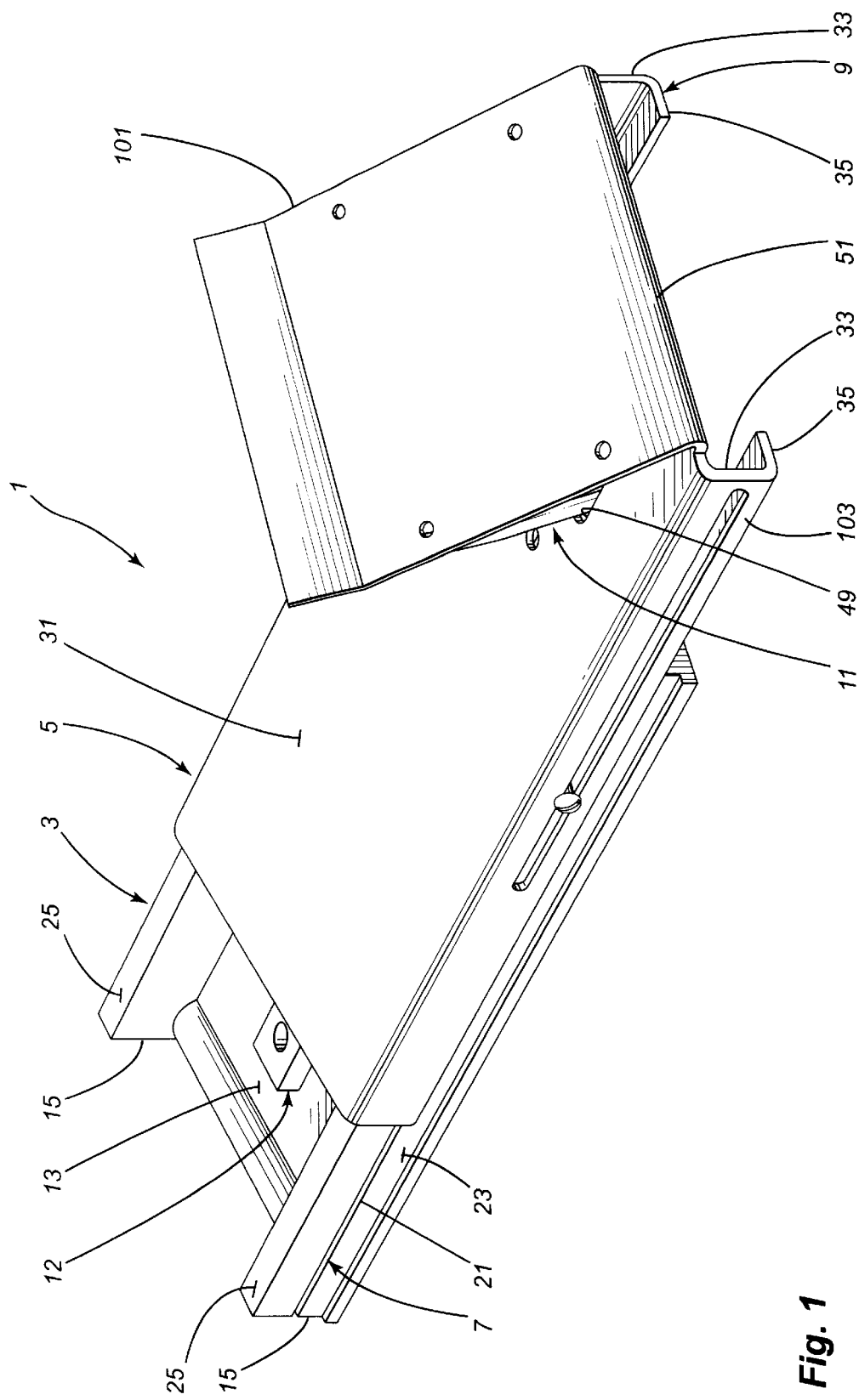
FIG. 1 is a perspective view of the support in an extended position.
Figure 2:
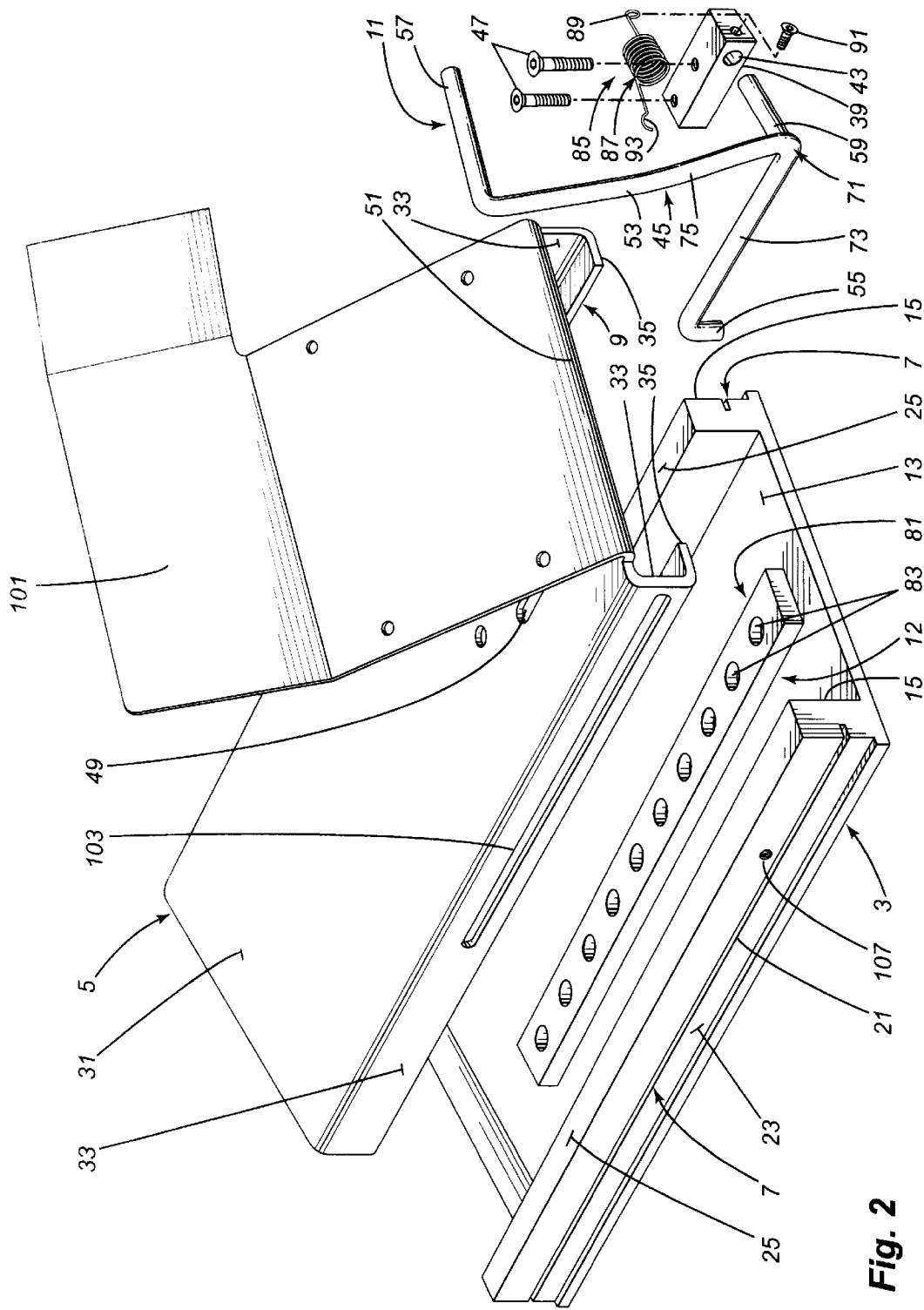
FIG. 2 is a perspective, exploded view of the support.

The telescopic support unit 1, as shown in FIGS. 1 and 2, comprises an elongated base member 3 and an elongated mounting member 5. The mounting member 5 is slidably mounted on top of the base member 3, via cooperating guide means 7, 9 on the members, for movement in the longitudinal direction of the base member 3. Cooperating locking means 11, 12 are provided on the base and mounting members 3, 5 respectively for locking the mounting member 5 in the desired longitudinal position relative to the base member 3.

In more detail, the base member 3 is U-shaped in cross-section with an elongated bottom wall 13 and relatively thick side walls 15 extending up from the long sides of the bottom wall 13. The side walls 15 can be made integral with the bottom wall 13, or connected thereto with suitable fasteners, not shown. Guide means 7 in the form of a longitudinal slot 21 is provided in the outer surface 23 of each side wall 15, the slot 21 parallel to the bottom wall 13 and spaced slightly below the top surface 25 of the side wall 15.

The mounting member 5 has a top wall 31, sidewalls 33 and short, in-turned, bottom walls 35. The in-turned bottom walls 35 form the guide means 9 on the mounting member 5, the walls 35 fitting in the slots 21 on the side walls 15 of the base member 3. The mounting member 5 slides along the base member 3, guided by the bottom walls 35 in the slots 21.

Figure 3:
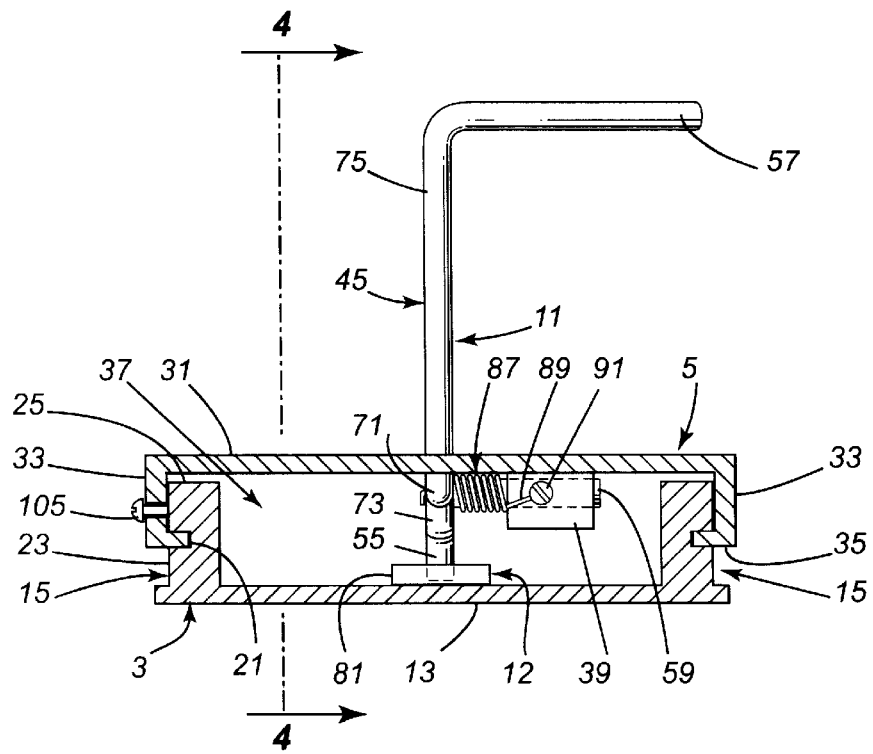
FIG. 3 is a cross section view of the support taken along line 3—3 of FIG. 4.
Figure 4:
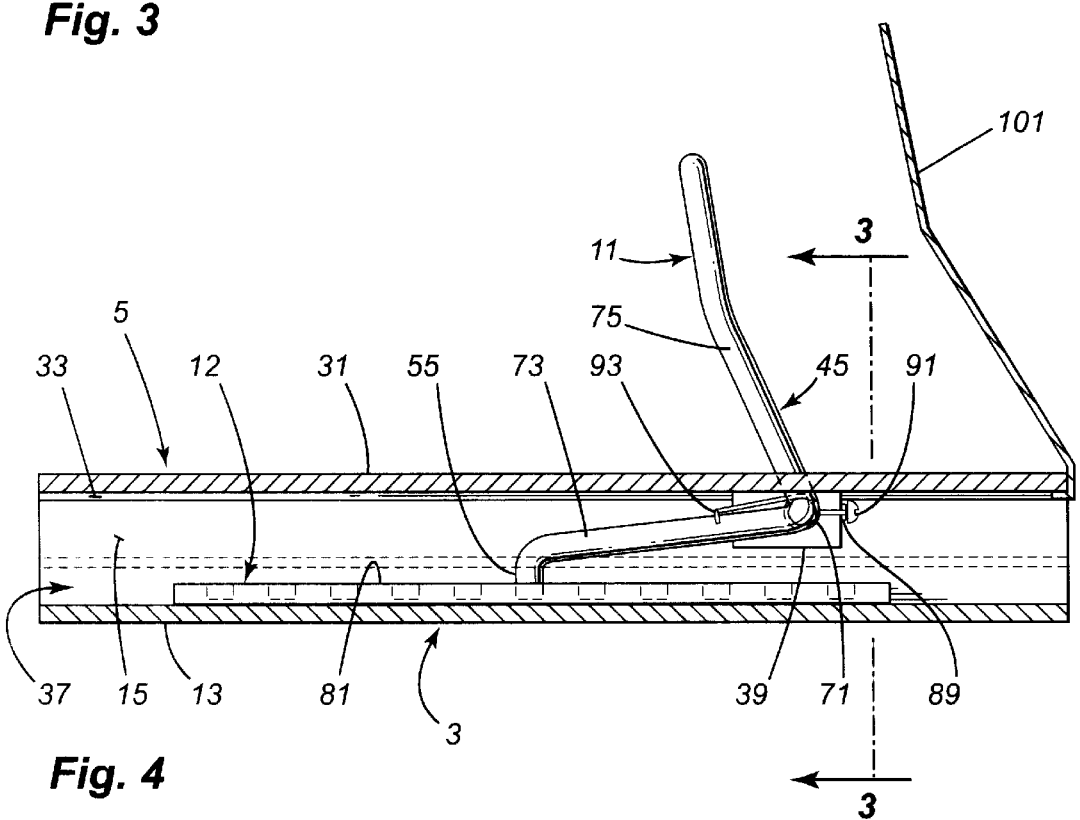
FIG. 4 is a cross-section view of the support taken along line 4—4 of FIG. 3.

When the mounting member 5 is mounted on the base member 3, a chamber 37 is formed between them as shown in FIGS. 3 and 4. The locking means 11, carried on the mounting member 5, is mounted within the chamber 37 to lock the mounting member 5 in one of several longitudinal positions relative to the base member 3. The locking means 11 includes a mounting block 39 mounting on the bottom surface of the top wall 31 of the mounting member 5. The block 39 has a through hole 43, as shown in FIG. 2, for receiving a lock member 45 as will be described. A pair of screws 47 fastens the block 39 to the top wall 31 adjacent a slot 49 close to the front edge 51 of the top wall 31.

The lock member 45, forming part of the locking means 11, is in the form of an elongated rod 53 pivotably mounted on the mounting block 39. The lock member 45 has a short rod section 55 at one end forming a lock pin and a longer rod section 57 at the other end forming a handle. Midway between the lock pin section 55 and the handle section 57 is a mounting pin 59 extending transverse from the rod 53. The mounting pin 59 extends through the hole 43 in the block 39.

The rod 53 has a sharp bend 71 at the mounting pin 59. The bend is slightly less than ninety degrees. A first, straight, rod section 73 extends from the bend 71. The lock pin section 55 is at the end of the first straight section 73 and extends transverse thereto. A second, relatively straight, rod section 75 extends from the bend 71 in the other direction from first section 73. The second section 75 can have a slight bend in its approximate center and the handle section 57 extends transverse from the free end of the second section 75.

When the lock member 45 is mounted in the block 39, its lock pin section 55 is adjacent the bottom wall 13 of the base member 3 and about midway between the sidewalls 15. The handle section 57 is located outside the chamber 41, the second straight section 75 passing through the slot 49. A lock strip 81, forming the locking means 12, is mounted on the top surface of the bottom wall 13 of the base member 3 by suitable fasteners, not shown. The locking strip 81 is about midway between the sidewalls 15 and extends over a substantial portion of the length of the bottom wall 13. A plurality of equally spaced apart holes 83 are provided in the strip 81. The lock pin section 55 on the lock member 45 enters one of the holes 83 on the lock strip 81 to prevent longitudinal movement of the mounting member 5 relative to the base member 3. Spring means 85 are provided for biasing the lock member 45 toward the lock strip 81. The spring means 85 can comprise a coil spring 87, slipped over the mounting pin 59 between the block 39 and the rod 53, and having one end 89 fixed to the mounting block 39 with a screw 91 and the other end 93 mounted on top of the first straight section 73 of the rod 53 a short distance from the mounting pin 59.

To unlock the mounting member 5 from the base member 3 so it can be adjusted longitudinally relative to the base member 3, the handle section 57 is pulled back, pivoting the pin section 55, against the action of the spring 87, upwardly out of one of the locking holes 83 in the lock strip 81. Pulling or pushing on the handle 57 now, while pulled back, locates the mounting member 5 in the desired position and then the handle 57 is allowed to pivot the pin section 55 back against the lock strip 81. Now, moving the handle 57 slightly back and forth, will locate the pin 55 in one of the locking holes 83 via the action of the spring 87. It is thus seen that the handle 57 acts to both unlock-lock the mounting member and to move it.

A support plate 101 can be mounted on the front edge 51 of the top plate 31 of the support member 5 for receiving a key pad unit (not shown) or the like, thereon. The support plate 101 slants rearwardly and is located sufficiently in front of the handle 57 to allow the handle to release the lock means when required.

A slot 103 can be provided in one of the sidewalls 33 of the mounting member 5. A screw 105 passes through the slot 103 into an opening 107 in one of the side walls 15 of the base member 3. The slot and screw arrangement limits the movement of the mounting member 5 relative to the base member 3.

Figure 5:
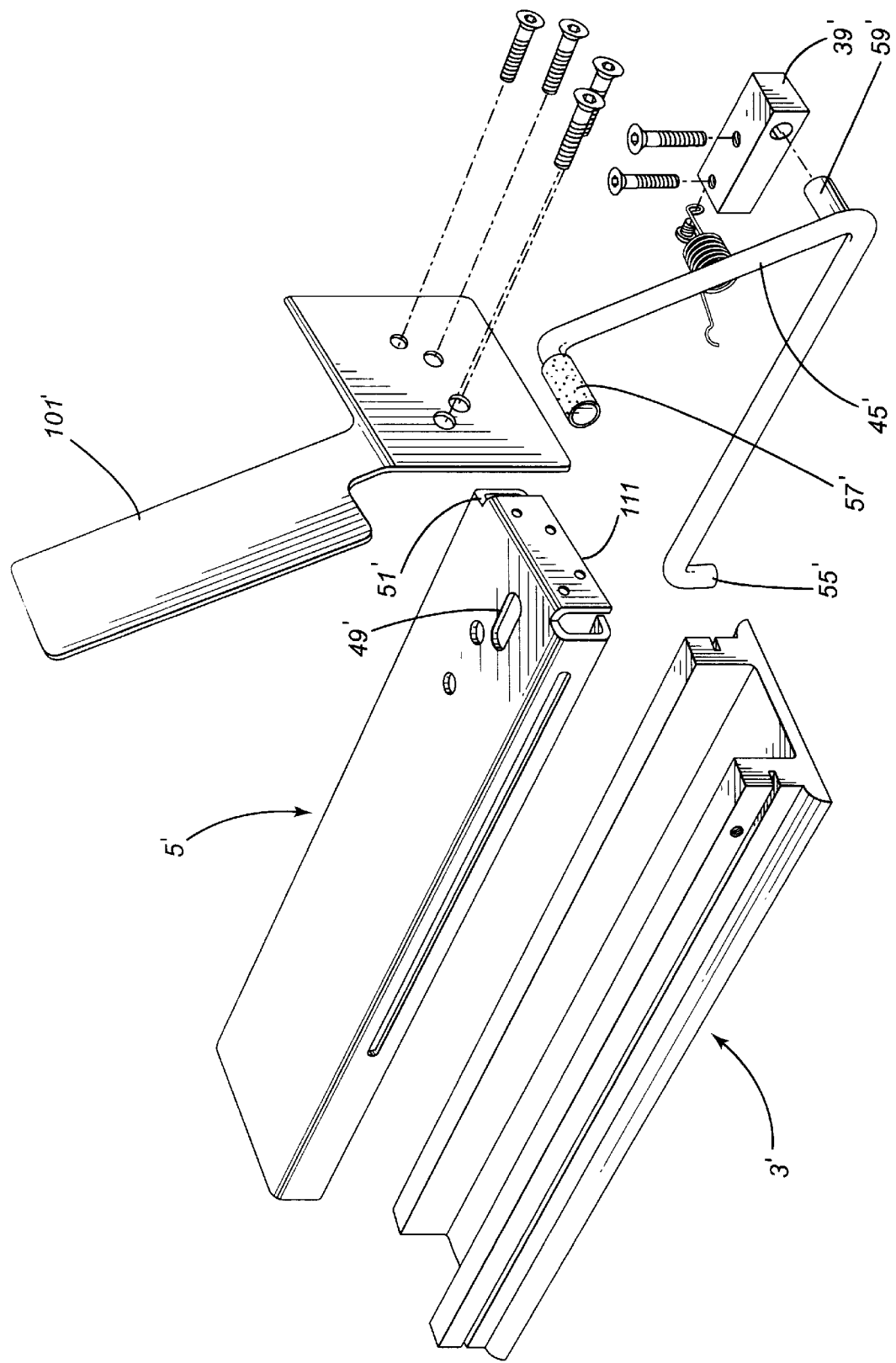
FIG. 5 is a perspective, exploded view of another embodiment of the support.

FIG. 5 shows a variation of the support where the mounting block 39' is located closer to the front edge 51' of the mounting member 5'. The mounting member 5' carries a mounting plate 111 at its front onto which the support plate 101' is attached. The slot 49' is close to the front edge 51' of the mounting member 5' but the handle 57' of the lock member 45' is still behind the support plate 101'.

Figure 6:
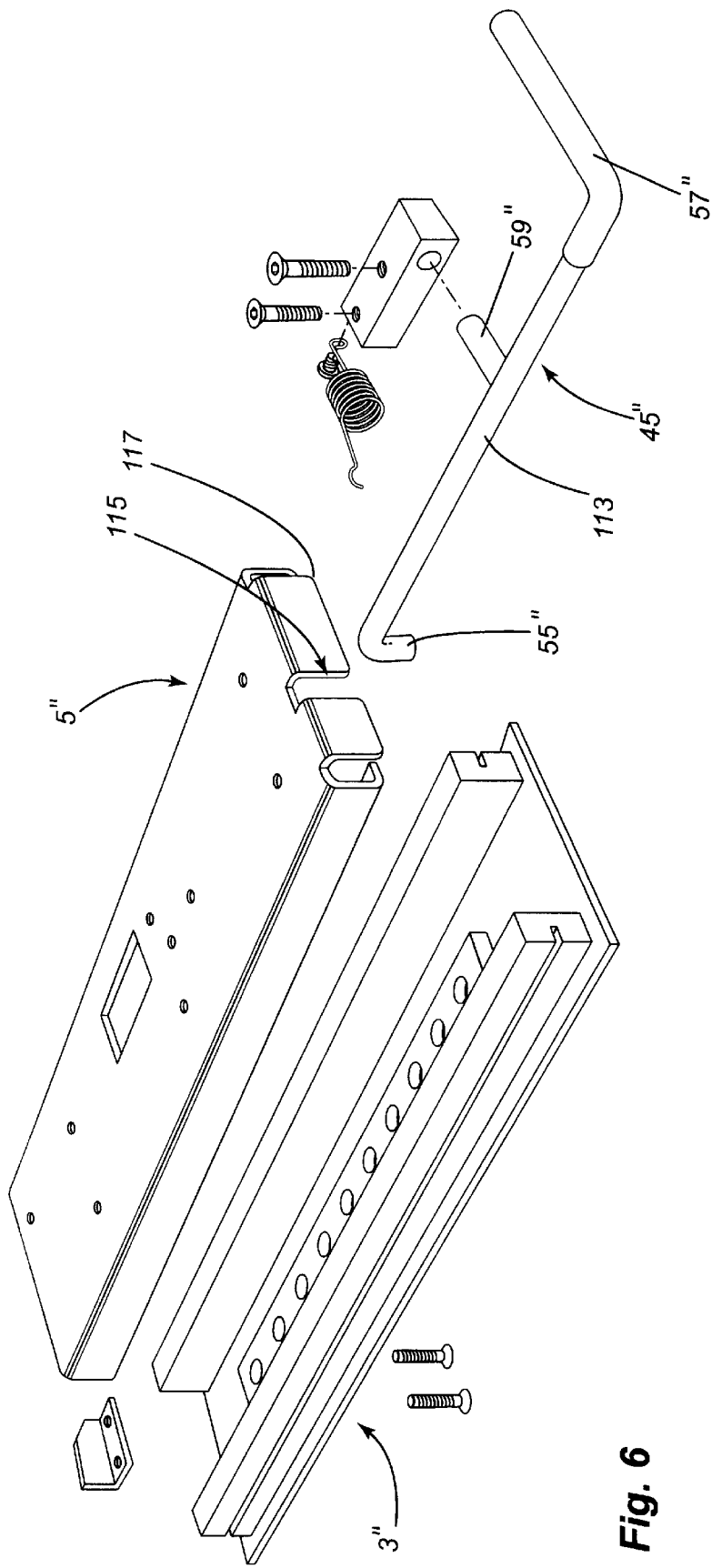
FIG. 6 is a perspective, exploded view of a further embodiment of the support.

FIG. 6 shows another variation of the support in which the lock member 45" has a straight rod section 113 with the lock pin 55" and handle 57" sections at its ends transverse thereto. The mounting pin 59" is about midway between the lock pin 55" and the handle 57" and is parallel to them. The handle section 57" extends out through an opening 115 in a front wall 117 on the front of the mounting member 5" and in this embodiment is located in front of and below the support plate 101".

Various modifications can be made to the device. For example, different cooperating guide means between the mounting and base embers could be employed. Also, the locking strip could be dispensed with and the locking holes could instead be formed right into the floor of the base member if desired. Other types of means could be employed to lock the locking pin to the base member. The slot and screw connection limiting movement of the mounting member relative to base member could be replaced with cooperating stop members on the mounting and base members.

The support unit 1 is adapted to be mounted on the dash of a vehicle, such as a bus, where it is accessible by the driver. The support unit 1 can be mounted on the dash via bolts or screws (not shown) passing through holes (not shown) in the floor 13 of the base 3. Preferably however, the support unit 1 is used in conjunction with an adjustable telescopic support post.

Figure 7:
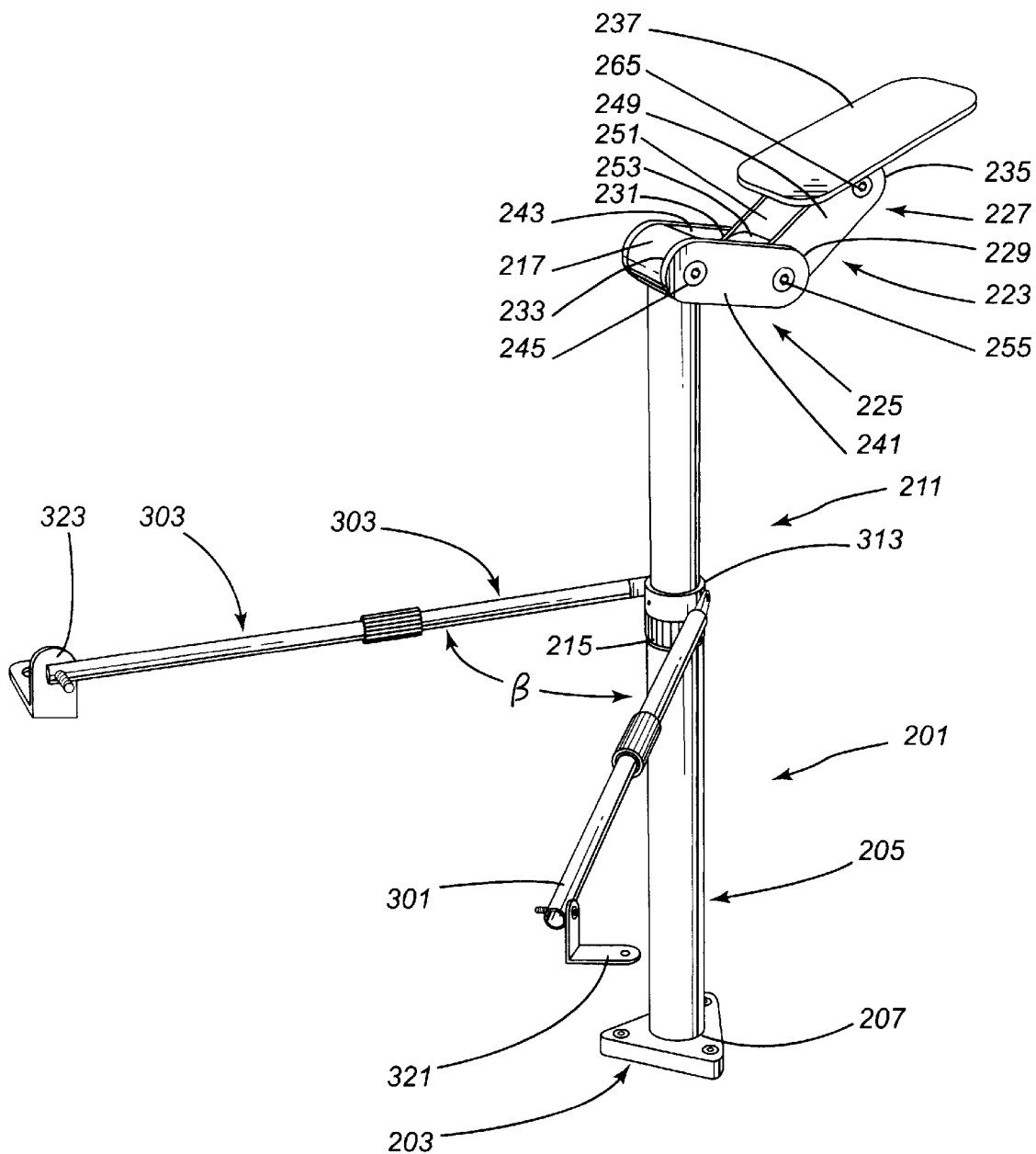
FIG. 7 is a perspective view of the support post.
Figure 8:
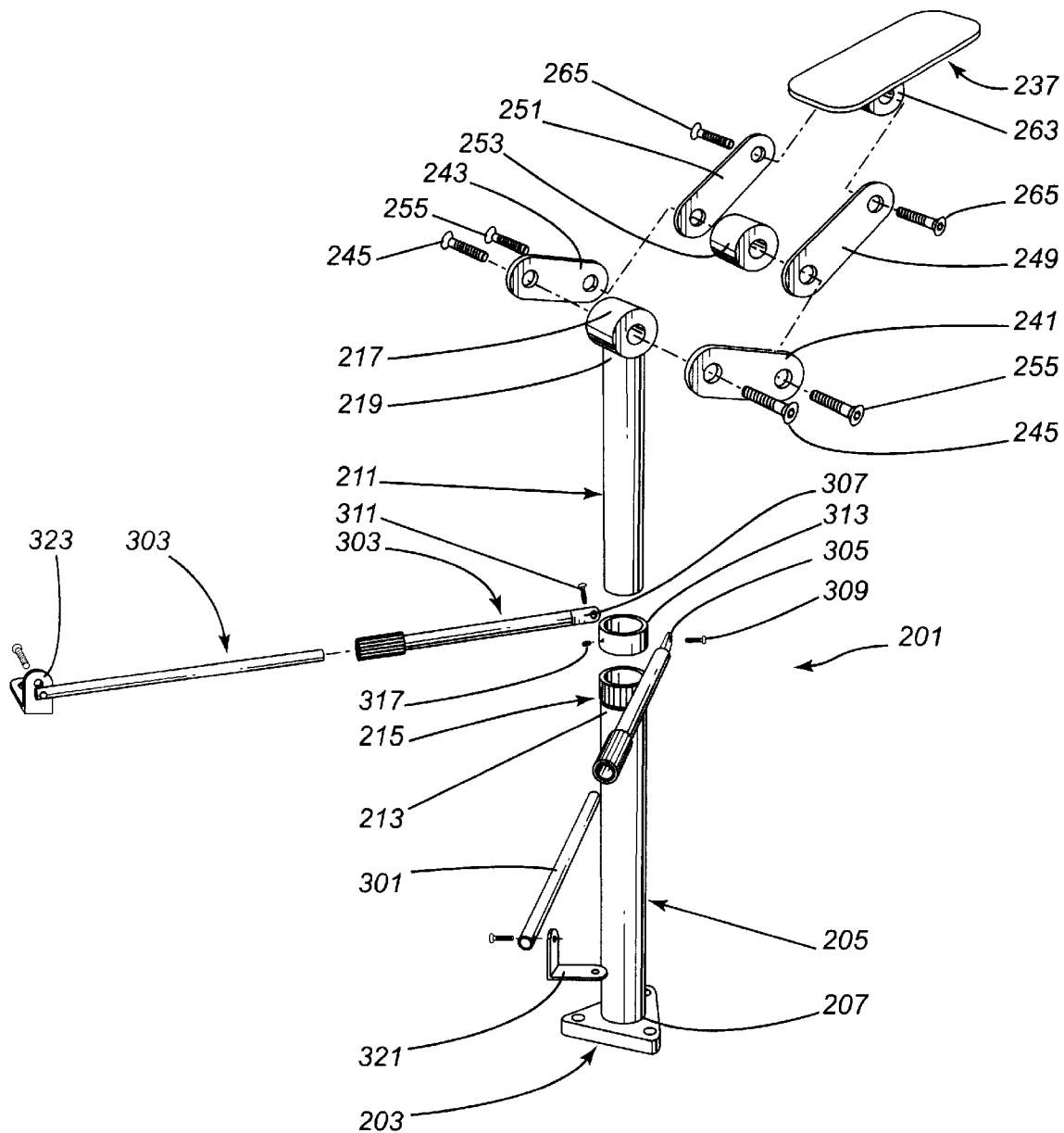
FIG. 8 is an exploded view of the support post.

As shown in FIGS. 7 and 8, the support post 201 comprises a base plate 203 having a first tubular section 205 fastened at one end 207 to the base plate 203 and extending upwardly therefrom. The first tubular section 205 slidably receives a second tubular section 211 within its open top end 213. The top end 213 of the first section 205 could be slightly tapered, slotted and threaded. A threaded collar 215 mounted on the threaded top end 213 of the first section 205 can tighten the top end 213 of the first section 205 about the second section 211 mounted therein to lock the second section 211 in place relative to the first section 205. A mounting block 217 is fixed on the top end 219 of the second tubular section 211.

An angled carrying unit 223 is pivotally mounted at one end to the mounting block 217 on the second post section 211. The carrying unit 223 comprises a pair of arm units 225, 227 pivotally mounted together at adjacent ends 229, 231. The free end 233 of one arm unit 225 is mounted on the block 217. The free end 235 of the other arm unit 227 pivotally mounts a support plate 237. The first arm unit 225 can comprise a first pair of parallel plates 241, 243 mounted at one end on either side of the first mounting block 217 by a first set of locking screws 245. The second arm unit 227 can comprise a second pair of parallel plates 249, 251 mounted at one end on either side of a second mounting block 253 by a second set of locking screws 255. The other ends of the first pair of plates 241, 243 are also mounted to the second mounting block 253 by the second set of locking screws 255. The support plate 237 is mounted, via a third mounting block 263 on its underside, to the other end of the second pair of plates 249, 251 via a third set of locking screws 265. The support unit 1 can be mounted on the top of the mounting plate 261 by suitable means (not shown).

It will be seen that the support post 201 provides a variety of adjustment in mounting the support unit 1 in an ideal position of use for the operator. The support plate 237 is adjustable angularly about the vertical axis of the tubular sections 205, 211 and is also adjustable angularly about the horizontal axis of any of the three sets of locking screws 245, 255, 265. The height of the mounting plate can be varied by the position of the second tubular section 211 relative to the first section 205 or by the positions of the arm units 225, 227 relative to first or second mounting blocks 217, 253.

Figure 9:
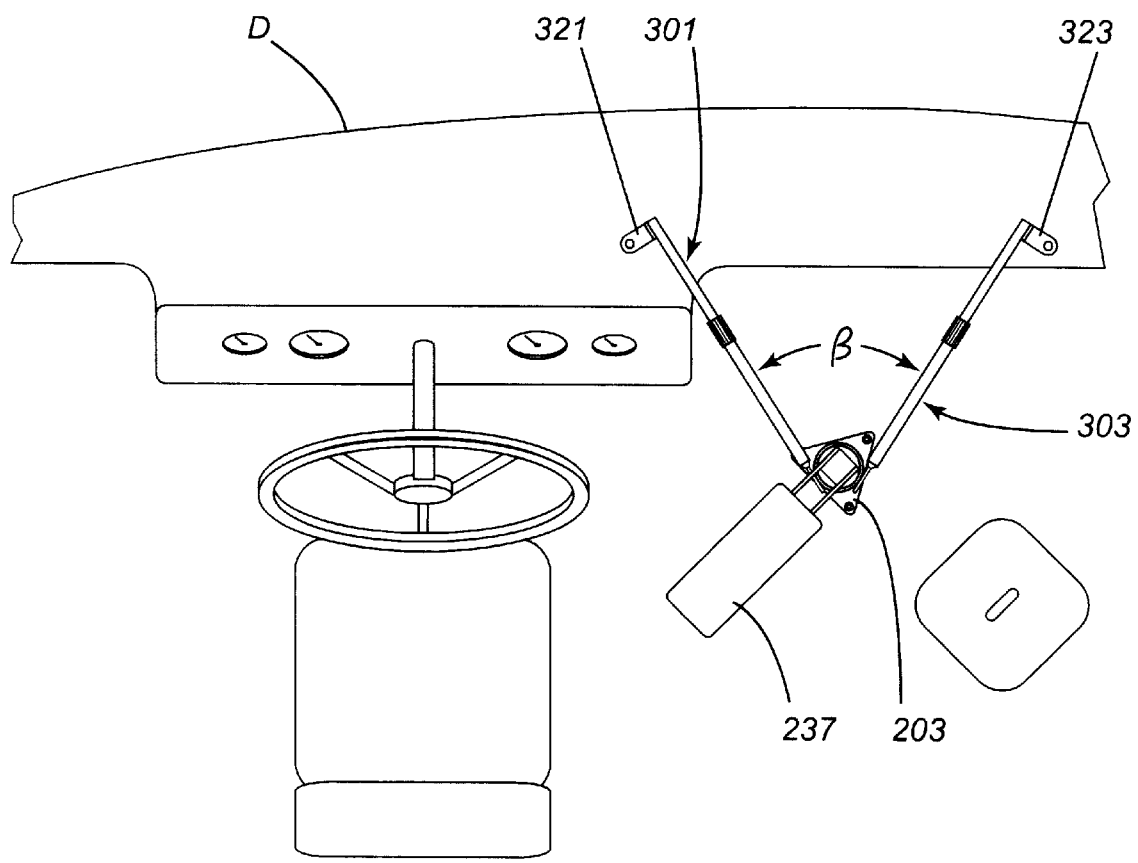
FIG. 9 shows the support and support post mounted in a bus.

If desired, the support post 201 can be provided with mounting arms 301, 303 to securely mount the post. The mounting arms 301, 303 can each be mounted at one end 305, 307 via locking screws 309, 311 onto a tubular sleeve 313. The sleeve 313 in turn is slidably mounted on the upper tubular section 211 of the support post 201. A set screw 317 can be used to lock the sleeve 313 in any desired vertical position on the upper tubular section 211. The arms 301, 303 can extend at any angle to the horizontal to the post 201. The sleeve 313 can also have a plurality of holes (not shown) about its circumference receiving the locking screws 309, 311 to provide adjustability in mounting the arms on the sleeve so as to be able vary the included angle B between them. The free ends of the arms 301, 303 can carry brackets 321, 323 by means of which the arms can be attached to the dashboard D on the vehicle, as shown in FIG. 9, to strengthen the post. The arms 301, 303 could be telescopic so as to be adjustable in length as desired.

What is claimed is:

1. An adjustable telescopic support having:

an elongated base member;

an elongated mounting member;

cooperating guide means on the base and mounting members for slidably mounting the mounting member on the base member for longitudinal movement relative to the base member;

the base member and mounting member forming a chamber between them when the mounting member is mounted on the base member;

mounting means on the front of the mounting member for use in mounting a manually operated unit thereon;

and cooperating locking means, separate from the guide means, on the base and mounting members within the chamber for selectively locking the mounting member to the base member in a selected longitudinal position.

2. A support as claimed in claim 1 wherein the locking means on the mounting member includes an operating handle outside the chamber at the front of the mounting member.

3. A support as claimed in claim 2 wherein the mounting member locking means includes a locking pin within the chamber, the locking pin connected to the operating handle via a connector member, the connector member pivoted to the mounting member via a pivot pin located intermediate the locking pin and the operating handle.

4. A support as claimed in claim 3 wherein the base locking means includes a longitudinal-extending line of spaced-apart holes in the bottom wall of the base member, the line of holes aligned with the locking pin.

5. A support as claimed in claim 4 including spring means biasing the locking pin toward the line of holes, the locking pin entering one of the holes when aligned with it to lock the support member to the base member against the longitudinal movement relative to the base member.

6. A support as claimed in claim 2 wherein the mounting member has a top wall and side walls; the base member has a bottom wall and side walls; the cooperating guide means on the side walls of the mounting and base members in a position to space the top wall of the mounting member from the bottom wall of the base member to form the chamber within the support.

7. A support as claimed in claim 6 wherein the mounting member locking means includes a locking pin within the chamber, the locking pin connected to the operating handle via a connector member, the connector member pivoted to the mounting member via a pivot pin located intermediate the locking pin and the operating handle.

8. A support as claimed in claim 7 wherein the base locking means includes a longitudinal-extending line of spaced-apart holes in the bottom wall of the base member, the line of holes aligned with the locking pin.

9. A support as claimed in claim 8 including spring means biasing the locking pin toward the line of holes, the locking pin entering one of the holes when aligned with it to lock the support member to the base member against longitudinal movement relative to the base member.

10. A support as claimed in claim 2 wherein the operating handle is located above the mounting member and adjacent its front end.

11. A support as claimed in claim 10 wherein the mounting means including a mounting plate extending up and rearwardly from the front of the mounting member and located in front of the operating handle a distance sufficient to allow operation of the handle.

12. A support as claimed in claim 10 wherein the mounting means is a front wall on the mounting member between the side walls.

13. A support as claimed in claim 2 wherein the handle extends forwardly from the front of the mounting member.

14. A support as claimed in claim 1 including a support post, the support post having a mounting base, a first tubular section extending up from the base and a second tubular section telescopically mounted within the first section, means for locking the second section at a desired height, and at a desired angular position, relative to the first section, and a carrying unit on the top of the second section for mounting the base member of the support thereon.

15. A support as claimed in claim 14 wherein the carrying unit comprises first and second arm units pivotally connected together at adjacent ends, the other end of one arm unit connected to the top of the second tubular section and the other end of the second arm unit pivotally connected to the support whereby the arm units allow the position of the support to be adjusted vertically and angularly relative to the horizontal.

16. A support as claimed in claim 15 including support arms adjustably mounted at one end on the second tubular section, the other ends of the support arms adapted to be mounted on a vehicle.

17. A support as claimed in claim 16 wherein the support arms are mounted on a tubular sleeve, the tubular sleeve adjustably mounted on the second tubular section.

18. A support as claimed in claim 1 wherein the mounting member has a top wall and side walls; the base member has a bottom wall and side walls; the cooperating guide means on the side walls of the mounting and base members in a position to space the top wall of the mounting member from the bottom wall of the base member to form the chamber within the support.

* * * * *